United States Patent [19]

Holland

[11] Patent Number: 4,960,502

[45] Date of Patent: Oct. 2, 1990

[54] PROCESS FOR CONVERSION OF OILS TO HYDROCARBON PRODUCTS

[75] Inventor: Floyd H. Holland, Borger, Tex.

[73] Assignee: Phillips Petroleum Company, Bartlesville, Okla.

[21] Appl. No.: 354,721

[22] Filed: May 22, 1989

Related U.S. Application Data

[62] Division of Ser. No. 6,084, Jan. 23, 1987, Pat. No. 4,853,189.

[51] Int. Cl.$^5$ .............................................. C10G 55/06
[52] U.S. Cl. ...................................... 208/85; 208/80; 208/113
[58] Field of Search ...................... 208/85, 92, 46, 80, 208/113

[56] References Cited

U.S. PATENT DOCUMENTS

| | | | |
|---|---|---|---|
| 1,613,124 | 1/1927 | Owens | 208/130 |
| 1,677,772 | 7/1928 | Herthel et al. | 37/103 |
| 2,666,734 | 1/1954 | Findlay | 196/120 |
| 2,914,459 | 11/1959 | Mills et al. | 208/92 |
| 3,019,272 | 1/1962 | Steinhofer | 208/92 |
| 3,265,610 | 8/1966 | Lavergne | 258/80 |
| 3,437,584 | 8/1969 | Hamblin | 208/80 |
| 3,474,156 | 10/1969 | Bloch | 208/92 |
| 3,767,564 | 10/1973 | Youngblood et al. | 208/106 |
| 4,331,533 | 5/1982 | Dean et al. | 208/113 |
| 4,434,049 | 2/1984 | Dean et al. | 208/153 |
| 4,562,046 | 12/1985 | Hays et al. | 422/160 |
| 4,650,566 | 3/1987 | Buyan et al. | 208/153 |
| 4,800,014 | 1/1989 | Hays et al. | 208/113 |
| 4,853,189 | 8/1989 | Holland | 196/126 |

OTHER PUBLICATIONS

Burgess-Manning Centrifugal Separators, Bulletin 3300.
Chemical Engineers' Handbok (4th Ed.), pp. 9-26 and 9-27.

*Primary Examiner*—Anthony McFarlane
*Attorney, Agent, or Firm*—Laney, Dougherty, Hessin & Beavers

[57] ABSTRACT

Process and apparatus for catalytic conversion of oils. A furnace heats a feedstock which is provided to a separator for separation of the feedstock into a gas vapor phase and a liquid phase. The liquid phase is provided under pressure to a venturi nozzle which atomizes the liquid oil. The atomized oil and the gas are each provided to a reactor such as the lower end of a riser reactor in a fluid catalytic cracking unit.

10 Claims, 2 Drawing Sheets

PROCESS FOR CONVERSION OF OILS TO HYDROCARBON PRODUCTS

This is a divisional of co-pending application Ser. No. 07/006,084 filed on Jan. 23, 1987, now U.S. Pat. No. 4,853,189.

BACKGROUND AND SUMMARY OF THE INVENTION

The instant invention pertains to the conversion of an oil feedstock to hydrocarbon products. In one aspect, the invention relates to catalytic cracking wherein a feedstock stream and catalyst are contacted in a reactor.

It is known that atomization of an oil feedstock stream for mixing with catalyst enhances many reactions. This is so because increased atomization increases the surface area of the oil and thereby increases heat transfer to the oil. Such heat transfer first vaporizes and thereafter drives the catalytic reactions.

Atomization of the oil as it enters the riser reactor in a fluid catalytic cracking unit is particularly important when converting heavy oils which have an initial boiling point generally in the temperature range of 600°F. to 1200°F. Heavy oils are especially difficult to crack to valuable products because their high boiling point and viscosity make satisfactory vaporization very difficult.

Heavy oils can be successfully cracked into desirable products where they have been vaporized prior to contact with the catalyst. With conventional feeds, vaporization is achieved by radiant energy transfer from the hot cracking catalyst to the feed droplets. This type of vaporization mechanism is satisfactory for oils that are vaporized below thermal cracking temperatures which commence at about 850°F. For heavy oils, however, vaporization may not be completed prior to the onset of thermal cracking and coke formation. Further, coke laydown is worsened where liquid oil strikes the hot catalyst particles. An apparatus and process for vaporizing a heavy oil would clearly be desirable.

It is common to pre-heat an oil feedstock in order to enhance vaporization and cracking of the oil in a fluid catalytic cracking unit. When the feedstock is so heated, some of the oil is vaporized prior to its introduction to a nozzle for atomization. Thus, the feedstock stream may comprise a two phase flow consisting of steam and oil vapor, on one hand, and liquid oil when it is injected into the nozzle for atomization. Atomization of two phase fluids increases nozzle wear. Also, nozzle atomization of a two phase fluid results in less efficient atomization than when a single liquid phase is introduced to the nozzle. Further, slugs of liquid and gas emitted from the nozzle can momentarily disrupt the catalyst-oil ratio in the unit, changing product distribution. It would be clearly desirable to provide an apparatus and process in which the liquid phase of a two phase hydrocarbon feedstock stream may be fully atomized when it is introduced to the riser reactor of a fluid catalytic cracking unit or otherwise contacts oil vapor from the preheating of the feedstock.

It is an object of the present invention to provide a process for atomizing an oil feed for catalytic conversion.

It is another object of the invention to provide such a process in which the liquid oil in a two phase feedstock stream is atomized into vapor and tiny droplets when introduced into a reactor for catalytic conversion.

It is another specific object of the invention to provide such a process in which wear on the oil nozzle used to introduce liquid oil into a reactor for catalytic conversion is substantially reduced.

It is still another object of the present invention to provide such a process which permits use of a shorter riser reactor and/or increases cracking yields and/or a reduces the severity of catalytic cracking unit operating conditions.

In one aspect, the invention comprises a process for catalytic conversion of hydrocarbons in which an oil feedstock is separated into vapor and liquid components. Thereafter, each of the separated components is separately introduced into a reactor for catalytic conversion. The process may include the steps of heating the feedstock prior to separation into vapor and liquid components and mixing the feedstock with steam prior to heating of the feedstock. In another aspect of the invention, the liquid component is atomized prior to introducing the same into a reactor for catalytic conversion. The atomization may be achieved by providing a liquid component under pressure to the throat of a venturi atomizer.

In yet another aspect of the invention, apparatus is provided for performing the process.

DETAILED DESCRIPTION OF THE INVENTION

Figure 1:
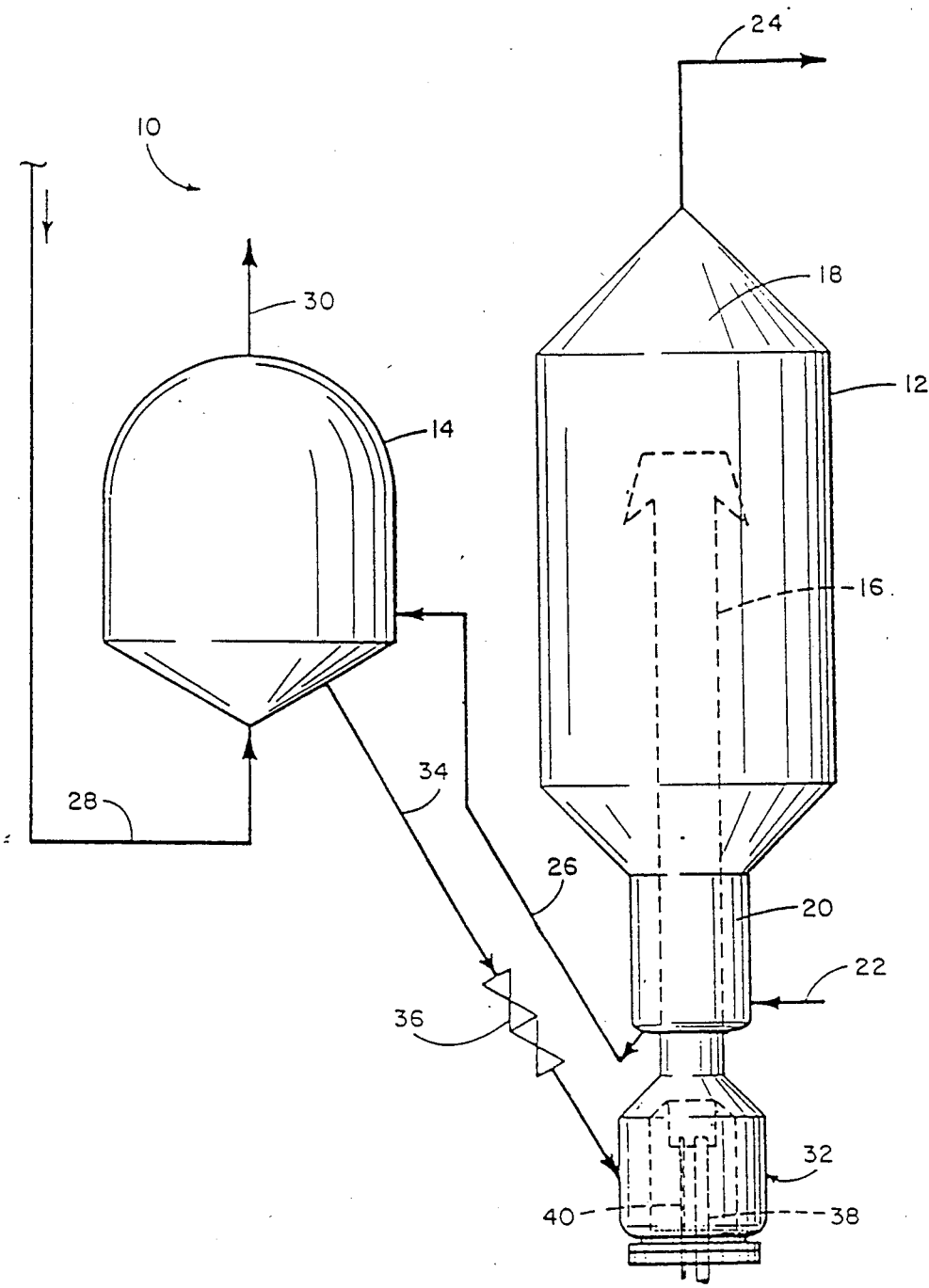
FIG. 1 schematically illustrates a catalytic cracking unit in combination with apparatus constructed in accordance with the instant invention.

Turning now to FIG. 1, indicated generally at 10 is a fluid catalytic cracking unit (FCCU) suitable for use with the instant invention. It should be appreciated that the invention may be used with other types of reactors as well. Included in FCCU 10 is a reactor 12 and a regenerator 14. Reactor 12 comprises a transfer line reactor or riser reactor 16, such being received within and coaxial with reactor 12. The reactor includes a catalyst/product separation zone 18 which usually contains several cyclone separators (not shown). A stripping section or zone 20 is provided for stripping entrained hydrocarbon from the coked catalyst under action of gas, usually steam, introduced to reactor 12 via line 22. It should be appreciated that the invention has applicability to transfer line reactors oriented other than vertically.

The separated product is conveyed via line 24 to a conventional separating tank and associated equipment.

After being stripped in zone 20, the cracking catalyst is conveyed from zone 20 to regenerator 14 in line 26 for coke burnoff. In the regenerator, oxygen-containing gas, such as heated air, is introduced through a line 28. Coke deposits are burned from the catalyst in regenerator 14 which forms an effluent gas that is separated from the catalyst in regenerator 14 which usually contains a plurality of cyclone separators (not shown). These flue gasses are withdrawn from the regenerator through line 30. Hot regenerated catalyst passes from regenerator 14 to the lower end of riser reactor 16 through a line 34 which, in the instant embodiment, empties into a lift pot 32 in the lower end of riser reactor 16. The catalyst flow rate through the cracking unit is controlled by valves 36 which are positioned in line 34, preferably in a vertical portion thereof.

At the lower end of the riser, catalyst from line 34 is mixed with a hydrocarbon atomized component which can be introduced into the lift pot via central pipe 38 and with a hydrocarbon vapor component which can be introduced into lift pot 32 through pipe 40.

The operating conditions for riser reactor 16 and regenerator 14 can be conventional. Usually, the temperature in riser reactor 16 will be in the range of from about 850° to about 1050°F. The oil is usually admixed with steam at a weight ratio of oil to steam in the range of from about 6:1 to about 25:1. A catalyst-oil weight ratio employed in riser reactor 16 is generally in the range of from about 1:1 to about 30:1, usually between about 2:1 and about 15:1. Pressure in the riser reactor is usually between about 15 and about 60 psia (pounds per square inch absolute). The cracking catalyst particles generally have a size in the range of from about 20 to about 200 microns, usually between about 40 and 80 microns. Flow velocity upward in the vertical section of the riser reactor is generally from about 10 to 30 feet per second in the lower portions and up to between about 40 and about 120 feet per second in the upper portions. The contact time between the catalyst and oil in the riser reactor is generally in the range of from about 1 to about 4 seconds, usually from 1.5 to about 3 seconds where the oil is injected into the bottom of the riser. The regenerator is operated at a temperature typically in the range of from about 1100° to about 1500°F. and is ordinarily provided with sufficient oxygen-containing gas to reduce the coke on the catalyst to a level of about 0.5 weight percent or less, perferably less than 0.1 weight percent.

Catalysts suitable for catalytic cracking includes silica alumina or silica magnesia synthetic microspheres or ground gels and various natural clay-type or synthetic gel-type catalysts. Most preferably, fluidizable zeolite-containing cracking catalysts are employed. Such catalysts generally contain from about 2 to about 20 percent based on total weight of zeolitic material, such as Y-zeolite, dispersed in a silica alumina matrix and have an equilibrium B.E.T. surface area in the range of 22–250 $m^2/g$ and a particle size chiefly in the range of 40 to 80 microns.

Figure 2:
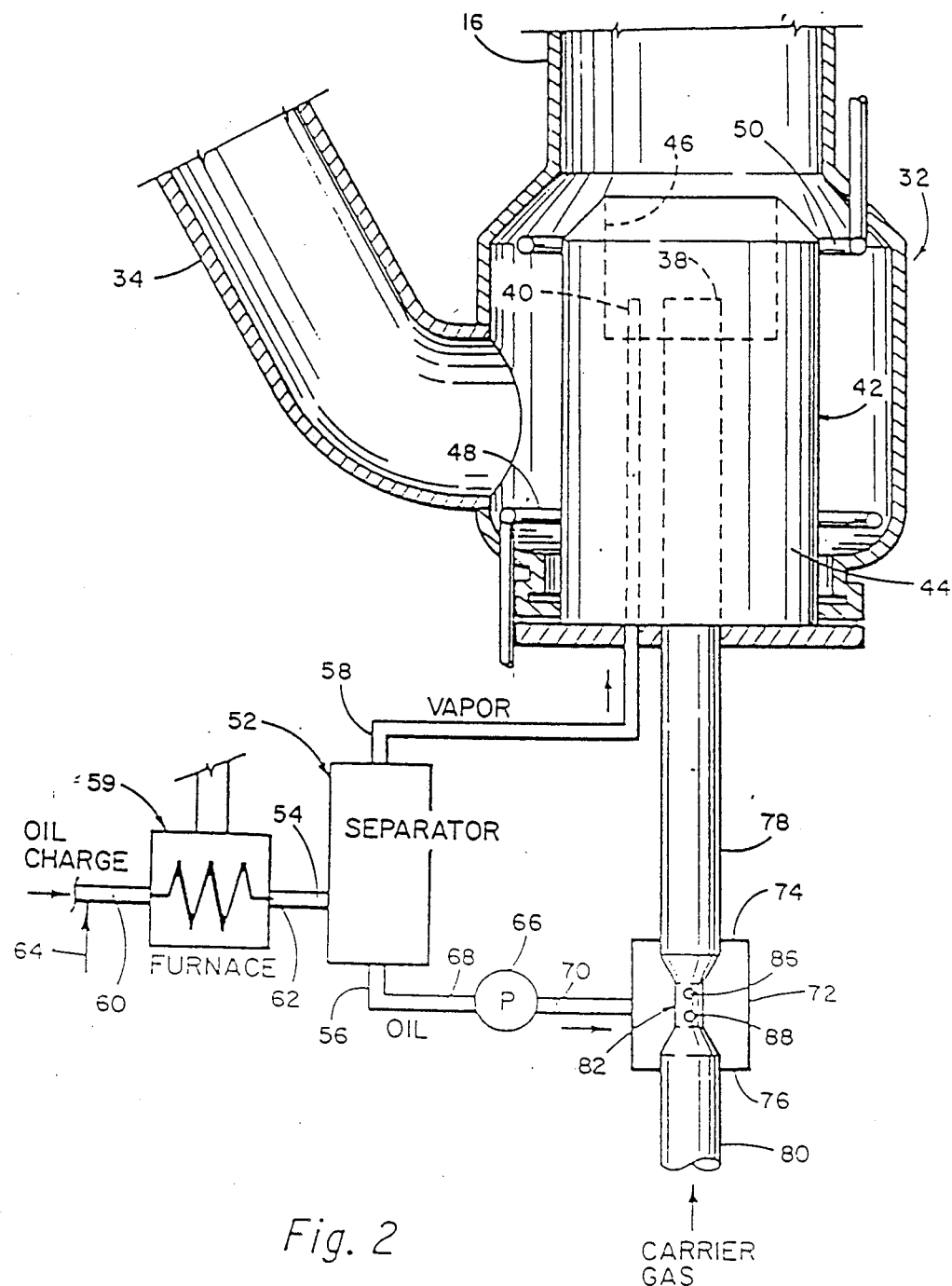
FIG. 2 is an enlarged view of a portion of FIG. 1 showing additional structure constructed in accordance with the instant invention.

Directing attention now to FIG. 2, consideration will be given to one manner in which atomized oil and oil vapor can be provided to the lower end of riser reactor 16. Lift pot 32 includes therein a nozzle cartridge assembly 42 into which central pipe 38 and pipe 40 are received. Cartridge assembly 42 is also referred to herein as means for introducing an atomized liquid stream and a vapor stream into a reactor for catalytic conversion. It should be noted that a suitable nozzle cartridge assembly 42 and lift pot 32 may be constructed in accordance with the disclosure, which is incorporated herein by reference, in U.S. Pat. No. 4,562,046 to Hayes et al. for a catalytic cracking unit using certain modifications disclosed herein. Generally speaking, cartridge assembly 42 includes a tubular member 44 having a generally cylindrical atomization chamber 46 formed therein. Central pipe 38, tubular member 44, and atomization chamber 46 are preferable all coaxial. Pipe 40 and central pipe 38 each extend into atomization chamber 46, the upper portion of which is open and in communication with the interior of lift pot 32 and the remainder of riser 16.

Preferably, atomized oil and oil vapor from pipes 38, 40, respectively, are mixed with fluidized cracking catalyst from line 34. To assist catalyst aeration or fluidization, a steam ring 48 is positioned in lift pot 32 for distributing a fluidizing gas such as steam into the lift pot. A steam sparger 48 preferably distributes fluidizing gas in the lower portion of the lift pot to move catalyst vertically upward. A second steam sparger 50 for distributing a fluidizing gas such as steam may be positioned at the upper end of the lift pot as shown in the drawing. Usually steam spargers 48, 50 each are formed of an annular distributor having a side wall with a plurality of ports therethrough which connect its interior with circumferentially spaced apart positions in the lift pot. The ports through the side wall of the annular distributor constituting steam sparger 48 can be oriented downwardly or upwardly to lift the catalyst introduced into the catalyst lift chamber to the annular distributor constituting steam sparger 50. The ports through the side wall of steam sparger 50 will generally be oriented toward the upper end of the riser reactor. In this manner the cracking catalyst can be conveyed in dilute phase at a desired velocity upward into riser reactor 16.

A separator 52, such also being referred to herein as means for separating an oil feedstock stream into a vapor component and a liquid component, includes input means such as a conduit 54, liquid output means such as a conduit 56, and vapor output means such as a conduit 58. Separator 52 can be conventional in structure and operation and receives a two phase flow via input means 54, in the instant case such being an oil feedstock stream, and separates the input stream into a vapor component or stream, which is emitted from the separator via output means 58, and a liquid component or stream, which is emitted from separator 52 via output means 56. A heater or furnace 59 has input means 60 and output means 62 and serves to heat fluid which is introduced into the furnace via input means 60 with the heated fluid being provided through output means 62. Furnace output 62 is in fluid communication with separator input means 54. A source (not shown) of oil feedstock is supplied to input means 60 and furnace 59. In addition, a source (also not shown) of steam is preferably introduced and steam is mixed with hydrocarbon feedstock via line 64 prior to introduction of the feedstock into the furnace, line 64 also being referred to herein as means for mixing steam with said feedstock stream.

In one embodiment of the invention, a first means forming a flow path from liquid output means 56 to the outlet of pipe 38 may include a centrifugal pump 66 having an inlet 68 and an outlet 70. Inlet 68 is in fluid communication with liquid output means 56 of separator 52 and outlet 70 is in fluid communication with pipe 38, preferably via a manifold means which may include a cylindrical chest 72. Chest 72 includes an upper end 74 and a lower end 76 each of which receives therethrough a pipe 78, 80, respectively. A fluid-tight seal is formed between each of ends 74, 76 and its associated pipe.

A mixing section comprising atomizing means such as venturi nozzle 82 is received within chest 72 and has input means in communication with pipe 80 and output means in communication with pipe 78 for accommodating a stream of carrier gas flow therethrough. The mixing section is generally formed from a tubular member having an opening, for example a pair of bores 86, 88, through the side wall thereby placing the interior of chest 72 in fluid communication with pipe 78. An annular cavity is formed between the chest and the mixing section which preferably includes a central narrow portion in which, in the instant embodiment of the invention, bores 86, 88 are formed. A source (not shown) of high velocity carrier gas, for example steam, H2, residue gas, or the like is provided to pipe 80 at substantially sonic velocity. Thus, the carrier gas flows into pipe 80, through the venturi nozzle, into pipe 78, and out of central pipe 38 into atomizing chamber 46 and riser reactor 16.

In operation, the feedstock stream is supplied to input means 60 of furnace 59, preferably in admixture with steam from line 64, which heats the mixture and provides the heated mixture to conduit 54 of separator 52. Steam is preferably added to the feedstock stream to help prevent internal tubes in the furnace from coking. The fluid output of the furnace is a two-phase mixture consisting of oil vapor generated as a result of the furnace heat and steam, which comprise the gas phase, and liquid oil, which comprises the liquid phase.

Separator 52 separates the two-phase mixture into a gas phase, consisting of oil vapor and steam, and a liquid phase, consisting of liquid oil, with the gas phase being supplied to pipe 40. The liquid phase is pressurized via pump 66 and is provided to the interior of chest 72. Pump 66 overcomes the pressure drop generated by nozzle 82. Atomized oil thus leaves nozzle 82 in pipes 78, 38 with sufficient velocity to enter the FCCU for catalytic conversion. Carrier gas is supplied to pipe 80 at generally near sonic velocity. The size and rate of operation of pump 66 is selected so that the pressure in the cavity is greater than the pressure inside the venturi nozzle thereby forcing oil through bores 86, 88. The oil is atomized in pipe 78 under the action of the venturi nozzle. Pipe 78 may contain turbulance generating members if desired. Thus, atomized oil generally having a droplet size of 200 microns or less, preferably having a droplet size of predominantly, on a weight basis, 100 microns or less, is emitted from central pipe 38 and gas consisting of oil vapor and steam is emitted from pipe 40 into atomization chamber 46 and then upwardly in riser reactor 16 thereby mixing with catalyst which is supplied to lift pot 32 via line 34. Steam emitted from steam spargers 48, 50, as has been previously described, mixes the catalyst with the vaporized oil and the mixture flows upwardly in riser reactor 16. Separated products are removed in the usual manner via line 24 and spent catalyst is transported to regenerator 14, as previously described, for regeneration.

It should be appreciated that chest 72, with venturi nozzle 82 received therein, may be received in tubular member 44 of cartridge assembly 42 without affecting operation of the fluid catalytic cracking unit described herein. Additions and modifications may be made to the instant embodiment of the invention without departing from the spirit thereof which is defined in the following claims.

I claim:

1. A process for enhancing the catalytic conversion of an oil feedstock containing liquid and vapor phases into hydrocarbon vapor products in a fluid catalytic cracking unit comprising the steps of:
    separating said oil feedstock into a vapor component and a liquid component; and
    atomizing said liquid component; and
    separately introducing said atomized liquid component and said vapor component into said cracking unit.

2. The process of claim 1 wherein said process further comprises the step of heating said oil feedstock prior to separating said feedstock into vapor and liquid components.

3. The process of claim 2 wherein said process further comprises the step of mixing said oil feedstock with steam prior to heating said oil feedstock.

4. The process of claim 1 wherein the step of atomizing the liquid component comprises contacting said liquid component with a high velocity carrier gas in a venturi nozzle.

5. The process of claim 4 wherein said process further comprises the step of pressurizing said liquid component prior to providing said liquid component to said venturi nozzle.

6. In a process for catalytic cracking therein an oil feedstock containing liquid and vapor phases is contacted with a cracking catalyst to form hydrocarbon vapor products in a fluid catalytic cracking unit, the improvement comprising:
    separating said oil feedstock into a vapor component and a liquid component;
    atomizing said separated liquid component by contacting said liquid component with a carrier gas;
    introducing said atomized liquid component and carrier gas into said cracking unit; and
    separately introducing said separated vapor component into said cracking unit.

7. The process of claim 6 which is further characterized to include the step of heating said oil feedstock prior to separating said feedstock into said vapor and liquid components.

8. The process of claim 7 wherein said separated liquid component is contacted with said carrier gas in a venturi nozzle.

9. The process of claim 8 which is further characterized to include the step of pressurizing said liquid component prior to providing said liquid component to said venturi nozzle.

10. The process of claim 9 which is further characterized to include the step of mixing said oil feedstock with steam prior to heating said oil feedstock.

* * * * *

UNITED STATES PATENT AND TRADEMARK OFFICE
CERTIFICATE OF CORRECTION

PATENT NO. : 4,960,502
DATED : October 2, 1990
INVENTOR(S) : Floyd H. Holland

It is certified that error appears in the above-identified patent and that said Letters Patent is hereby corrected as shown below:

Column 6, line 9, after the ";", delete the word "and";

Column 6, line 29, after the word "for", delete the words "catalytic cracking therein" and insert the words --catalytic cracking wherein--.

Signed and Sealed this

Twenty-first Day of January, 1992

Attest:

HARRY F. MANBECK, JR.

*Attesting Officer*   *Commissioner of Patents and Trademarks*